(12) United States Patent
Gregorius

(10) Patent No.: US 7,404,050 B2
(45) Date of Patent: Jul. 22, 2008

(54) METHOD OF OPERATING A MEMORY DEVICE, MEMORY MODULE, AND A MEMORY DEVICE COMPRISING THE MEMORY MODULE

(75) Inventor: Peter Gregorius, München (DE)

(73) Assignee: Infineon Technologies AG, Munich (DE)

( * ) Notice: Subject to any disclaimer, the term of this patent is extended or adjusted under 35 U.S.C. 154(b) by 286 days.

(21) Appl. No.: 11/194,773

(22) Filed: Aug. 1, 2005

(65) Prior Publication Data

US 2007/0028059 A1    Feb. 1, 2007

(51) Int. Cl.
G06F 12/00 (2006.01)

(52) U.S. Cl. ............................ 711/154; 711/5; 711/105; 711/100

(58) Field of Classification Search ................ 711/154, 711/5, 100, 105
See application file for complete search history.

(56) References Cited

U.S. PATENT DOCUMENTS

| | | |
|---|---|---|
| 5,963,464 A | 10/1999 | Dell et al. |
| 2003/0046507 A1* | 3/2003 | Swanson ................... 711/170 |
| 2003/0193927 A1* | 10/2003 | Hronik ........................ 370/351 |
| 2004/0158675 A1* | 8/2004 | Hirose ......................... 711/115 |
| 2006/0179262 A1* | 8/2006 | Brittain et al. .............. 711/169 |

FOREIGN PATENT DOCUMENTS

EP    1 030 309 A1    8/2000

* cited by examiner

Primary Examiner—Kimberly Mclean
(74) Attorney, Agent, or Firm—Maginot, Moore & Beck

(57) ABSTRACT

There is provided a method of operating a memory device comprising at least one memory module, a corresponding memory module and a memory device comprising the at least one memory module. It is proposed that in the memory module (100a, 100b, 100c, 100d) a command and write data signal (CA, WD) is received and a read data signal (RD) is transmitted from the memory module (100a, 100b, 100c, 100d). Further, an input clock signal (CLK) is received in the memory module (100a, 100b, 100c, 100d) and is regenerated by means of a clock synthesizer unit (150) of the memory module (100a, 100b, 100c, 100d) to produce a regenerated input clock signal of the memory module (100a, 100b, 100c, 100d). The read data signal (RD) transmitted from the memory module (100a, 100b, 100c, 100d) is synchronized to the regenerated input clock signal of the memory module (100a, 100b, 100c, 100d). For this purpose, the clock synthesizer unit (150) preferably comprises a phase-locked loop.

30 Claims, 9 Drawing Sheets

State of the Art

US 7,404,050 B2

METHOD OF OPERATING A MEMORY DEVICE, MEMORY MODULE, AND A MEMORY DEVICE COMPRISING THE MEMORY MODULE

FIELD OF THE INVENTION

The present application relates to a method of operating a memory device, a memory module configured for performing said method, and a memory device comprising said memory module. In particular, the invention relates to memory devices having a so-called loop-forward architecture and the distribution and transfer of control, data, and clock signals in such a memory device.

BACKGROUND

In present computer systems memory devices for both reading and writing data, i.e. memories designated as RAM (Random Access Memory), are usually realized on the basis of memory modules of the so-called DDR type (double-data rate type). These memory modules can be accessed in read and write operations at a very high speed, thereby offering a high data bandwidth. In these memory devices, the transfer of control and data signals between memory modules of the memory device and a memory controller is synchronized on a system level to a reference clock provided by the memory controller. This means that the data transfers of all memory modules have simultaneously to be synchronized to the same clock signal. For increasing memory speeds, i.e. higher frequencies of the clock signal, and larger numbers of memory modules, the difficulties in providing the data transfer between the memory controller and the memory modules increase, and eventually a reliable data transfer becomes impossible.

In view of these problems, there has been proposed a new type of architecture for memory devices, which is of a so-called loop-forward type. This means that a plurality of memory modules is connected in series to the memory controller and that a command and address signal, a write data signal, and a read data signal are forwarded from a first memory module of the series of memory modules to the next memory module and so on. Finally, the read data signal is transferred from the last memory module of the series of memory modules to the memory controller.

The structure of a memory device corresponding to the loop-forward architecture is illustrated in FIG. 1. As can be seen, the memory device 100' comprises a plurality of memory modules 100a', 100b', 100c', and 100d', which are identically configured. The memory device 100' is connected to a memory controller 200'. The memory controller 200' provides for the connection to components of a computer system, such as a central processing unit and other devices connected to a system bus (not shown).

The memory controller 200' provides a command and address signal CA and a write data signal WD to the memory device 100'. The command and address signal CA and the write data signal WD are transmitted via a digital bus having a suitable width for carrying said signals. In the following, the command and address signal CA and the write data signal WD will be referred to in combination as command and write data signal CA, WD. Further, the memory controller 200' provides to the memory device 100' a clock signal CLK. The memory controller 200' receives from the memory device 100' a read data signal RD and a corresponding clock signal TxPCK.

Each of the memory modules 100a', 100b', 100c', 100d' comprises a memory core 110' and a core interface 120'. Via the core interface 120' the memory core 110' is connected to circuitry for receiving and transmitting data.

The circuitry for receiving and transmitting data comprises for each of the memory modules 100a', 100b', 100c', 100d' a primary receiver RxP for receiving the command and write data signal CA, WD in the memory module 100a', 100b', 100c', 100d' and a primary transmitter TxP for transmitting the read data signal RD from the memory module 100a', 100b', 100c', 100d'. Further, each of the memory modules 100a', 100b', 100c', 100d' comprises a secondary transmitter TxS for transmitting the command and write data signal CA, WD from the memory module 100a', 100b', 100c', 100d' and a secondary receiver RxS for receiving the read data signal RD in the memory module 100a', 100b', 100c', 100d'. The primary receiver RxP, the secondary receiver RxS, the primary transmitter TxP, and the secondary transmitter TxS allow for the memory modules 100a', 100b', 100c', 100d' to be connected in series as illustrated in FIG. 1. Each of the primary and secondary receivers RxP, RxS and the primary and secondary transmitters TxP, TxS is configured to synchronize the received or transmitted signal to a respective input clock signal, thereby allowing for a transfer of the command and write data signal CA, WD and of the read data signal RD between different clock domains.

In the first memory module 100a' the clock signal CLK provided from the memory controller is used as the input clock signal of the primary receiver RxP. The same clock signal is also used as the input clock signals of the primary transmitter TxP and the secondary transmitter TxS.

Further, the clock signal CLK provided by the memory controller is fed into a delay-locked loop (DLL) 150'. The DLL 150' generates from its input clock signal a delayed clock signal which is used for controlling read and write operations of the memory core 110' via the core interface 120'.

The input clock signals of the primary transmitter TxP and the secondary transmitter TxS are forwarded to a respective signal output of the first memory module 100a' and from there to the second memory module 100b'. Further, also the input clock signal of the DLL 150' is forwarded to a respective signal output of the first memory module 100a' and from there to the second memory module 100b'.

Consequently, the second memory module 100b' receives at corresponding signal inputs the input clock signal of the DLL 150' of the first memory module 100a', i.e. the clock signal CLK provided by the memory controller, the input clock signal of the primary transmitter TxP of the first memory module 100a' and the input clock signal of the secondary transmitter TxS of the first memory module 100a'. Further, the secondary memory module 100b' receives the command and write data signal CA, WD and the read data signal RD which are transmitted from the first memory module 100a'.

In the second memory module 100b' it is possible to select via multiplexers 130', 140', which of the received clock signals are used as the input clock signals of the primary receiver RxP and the secondary receiver RxS. Generally, all these clock signals have been derived from the clock signal CLK provided by the memory controller 200', but have been transmitted via different signal paths and therefore the signal quality may be different. In the second memory module 100b', again the same input clock signal as for the primary receiver RxP is used as the input clock signals of the primary transmitter TxP and the secondary transmitter TxS. Like in the first memory module 100a', the input clock signals of the primary transmitter TxP, the secondary transmitter TxS, and the DLL 150' are forwarded to the next memory module, i.e. to the third memory module 100c'. The transfer of signals between the second memory module 100b' and the third memory module 100c', and also between the third memory module 100c' and the fourth memory module 100d' is the same as the signal transfer between the first memory module 100a' and the second memory module 100b'. The internal signal processing in the third and fourth memory modules 100c', 100d' is the same as for the second memory module 100b'. From the fourth memory module 100d', which is the last memory module of the series of memory modules, the read data signal RD is transmitted to the memory controller 200' together with the associated input clock signal of the primary transmitter which is designated as TxPCK.

The structure of the memory modules 100a', 100b', 100c', 100d' is such that either the read data signal RD is generated in the memory module according to data stored in the memory core 110' in response to a corresponding command received via the command and write data signal CA, WD or the read data signal RD received from another memory module located upstream in the series of memory modules is forwarded.

A major advantage of this loop-forward architecture of the memory device is that the overall latency with respect to receiving and transmitting signals is the same for each of the memory modules. For example, the first memory module 100a' will have the shortest latency with respect to receiving the command and write data signal from the memory controller 200', but the longest latency with respect to transmitting the read data signal RD to the memory controller 200'. Conversely, the fourth memory module 100d' has the longest latency with respect to receiving the command and write data signal CA, WD from the memory controller 200' and the shortest latency with respect to transmitting the read data signal RD to the memory controller 200'. Obviously, the overall latency is constant for each of the memory modules 100a', 100b', 100c' and 100d'.

However, in the memory device illustrated in FIG. 1 there exist problems with respect to the quality of the input signals received by the memory modules 100a', 100b', 100c', 100d' and by the memory controller 200'. In particular, before reaching the fourth memory module 100d', the clock signal CLK provided by the memory controller has been passed through all the other memory modules 100a', 100b', and 100c'.

Moreover, the clock signal CLK provided by the memory controller 200' may already have undergone a substantial degradation when it is received from the memory controller 200' in the first memory module 100a', thereby affecting the transmission of the command and write data signal CA, WD and the read data signal RD to the next memory module and further to the other memory modules. As a result, it will generally be difficult or even impossible to receive the read data signal RD in the memory controller 200' at a desirable speed, i.e. to use a high frequency for the clock signal CLK.

SUMMARY

Therefore, there exists a need for improvements of a memory device of the above-mentioned loop-forward type. In particular, it is an object of the present invention to provide a possibility for transmitting at least the read data signal to a next memory module of a series of memory modules or to the memory controller of a memory device on the basis of a high-quality clock signal so that the memory device can be operated with an increased data rate.

These objects are achieved by embodiments of the invention.

In view of the above objects, an embodiment of the present invention provides a method of operating a memory device including at least one memory module. The method is based on receiving a command and write data signal in the memory module, transmitting a read data signal from the memory module, and receiving an input clock signal in the memory module.

The method further comprises regenerating the input clock signal of the memory module in a clock synthesizer unit of the memory module to produce a regenerated input clock signal of the memory module, and synchronizing the read data signal transmitted from the memory module to the regenerated input clock signal of the memory module.

For regenerating the input clock signal of the memory module, the clock synthesizer unit of the memory module preferably comprises a phase-locked loop which receives the input clock signal and produces as an output signal the regenerated input clock signal. The clock synthesizer unit is preferably also used to provide a clock signal for controlling a memory core of the memory module, this clock signal being delayed or phase-shifted with respect to the input clock signal of the clock synthesizer unit. In this way, the clock synthesizer unit simultaneously accomplishes the function of a clock signal delaying means which in the state of the art as described above is accomplished by the delay-locked loop (DLL). As an alternative to the phase-locked loop or in addition the clock synthesizer unit may also comprise a DLL which is used to receive the input clock signal of the memory module and to produce as an output signal the regenerated input clock signal.

In addition to synchronizing the read data signal transmitted from the memory module to the regenerated input clock signal, the method preferably also comprises generating the input clock signal of the memory module by a phase-locked loop. In this way, the input clock signal of the memory module may be provided with a higher quality and the requirements with respect to regenerating the input clock signal in the clock synthesizer unit of the memory unit may be reduced.

The phase-locked loop for providing the input clock signal of the memory module and/or the phase-locked loop of the clock synthesizer unit is preferably digitally implemented.

Preferably, the memory module is comprised in a series of memory modules which are arranged in a loop-forward configuration. In this case, the method comprises transmitting the read data signal from one memory module of the series of memory modules to a next memory module of the series of memory modules, receiving the read data signal in said next memory module, and transmitting the read data signal from said next memory module. The memory modules are operated as described above, i.e. an input clock signal is received in the memory module and regenerated in a clock synthesizer unit to produce a regenerated input clock signal of the memory module. The read data signal transmitted from the memory modules is synchronized to the regenerated input clock signal of the respective memory module. Accordingly, the method comprises forwarding the read data signal from one memory module of the series of memory modules to the next memory module. Preferably, the read data signal is transmitted from the last memory module of the series of memory modules to a memory controller. The number of memory modules in said series of memory modules is not particularly limited. Further, the method may be applied to more than one series of memory modules. In this case, the memory controller preferably receives in parallel the read data signals transmitted from the last memory module of each series of memory modules.

Here, it is to be understood that forwarding the read data signal from one memory module to the next memory module may either comprise generating the read data signal in the memory module according to data stored in the memory core of the memory module and transmitting the read data signal from the memory module or receiving the read data signal in the memory module from another memory module located upstream in the series of memory modules and transmitting the read data signal from the memory module, depending on the particular type of operation initiated by the command and write data signal, i.e. a read operation on a memory module located upstream from the memory module, a read operation on the same memory module, or a write operation.

Besides forwarding the read data signal from one memory module to the next memory module, the method may also comprise forwarding the command and write data signal from one memory module to the next memory module. In this case, it is preferred that also the command and write data signal transmitted from the memory module is synchronized to the regenerated input clock signal of the memory module.

According to a further embodiment of the invention, there is provided a memory module which comprises a first receiver for receiving a command and write data signal in the memory module, a first transmitter for transmitting a read data signal from the memory module, and a clock synthesizer unit for regenerating an input clock signal of the memory module. In said memory module, the first transmitter is configured to synchronize the transmitted read data signal to the regenerated input clock signal.

In order to allow for arranging the memory module in a loop-forward configuration, preferably there is also provided a second receiver for receiving a read data signal in the memory module. Moreover, there may also be provided a second transmitter for transmitting the command and write data signal from the memory module, the second transmitter being configured to synchronize the transmitted command and write data signal to the regenerated input clock signal of the memory module. In the latter case, it is also possible to forward the command and write data signal from one memory module of a series of memory modules to the next memory module.

The clock synthesizer unit of the memory module preferably comprises a phase-locked loop. In particular, the phase-locked loop may be digitally implemented.

As described herein, the digitally implemented phase-locked loop preferably comprises a phase detector configured to generate a digital phase difference signal depending on the input clock signal and a feedback clock signal, a digital filter configured to receive the phase difference signal and to generate a digital filtered phase difference signal, and a digitally controlled oscillator which is controlled in response to the filtered phase difference signal. Preferably, the phase-locked loop also comprises a digital frequency difference detector which receives the input clock signal and the feedback clock signal and produces a digital frequency difference signal.

In addition to regenerating the input clock signal of the memory module, the clock synthesizer unit is preferably also configured to provide a clock signal to a memory core of the memory module with a suitably adjusted and controlled delay or phase shift with respect to the input clock signal of the memory module. This is important for achieving the desired phase relations between control signals for performing read and write operations on the memory core.

According to a further embodiment of the present invention, there is provided a memory device comprising at least a first and a second memory module, each memory module comprising a first receiver for receiving a command and write data signal in the memory module, a first transmitter for transmitting a read data signal from the memory module, and a clock synthesizer unit for regenerating an input clock signal of the memory module. At least the second memory module further comprises a second receiver for receiving the read data signal transmitted from the first memory module in the second memory module. Of course, the memory modules may be identically configured and also the first memory module may comprise a second receiver. The first transmitter of each memory module is configured to synchronize the transmitted data signal to the regenerated input clock signal of the respective memory module.

The first and the second memory module may be included in a series of memory modules. Here, the first memory module may for example constitute the first memory module of the series of memory modules and be configured to receive the command and write data signal from a memory controller, or may constitute an intermediate memory module. The second memory module may for example constitute the last memory module of the series of memory modules and be configured to transmit the read data signal to a memory controller. The second memory module may also constitute an intermediate memory module and be configured to transmit the read data signal to a next memory module of the series of memory modules.

The memory modules of the memory device are preferably configured as the memory modules described with respect to the above embodiment.

The memory device may comprise more than the first and the second memory module which are connected in series in a loop-forward configuration. Moreover, the memory device may also comprise several series of memory modules forming parallel paths with respect to the loop-forward configuration.

BRIEF DESCRIPTION OF THE DRAWINGS

In the following, exemplary embodiments of the present invention will be explained in more detail with reference to the accompanying drawings, in which.

DETAILED DESCRIPTION

The following description will be given with respect to a memory device to be used in a computer system, such as a DDR-type memory device comprising memory modules with a dynamic random access memory core (DRAM core). The described concepts are, however, not limited thereto and may also be applied to other types of random access memory. Throughout the description and the figures similar components are designated with the same reference signs.

Figure 1:
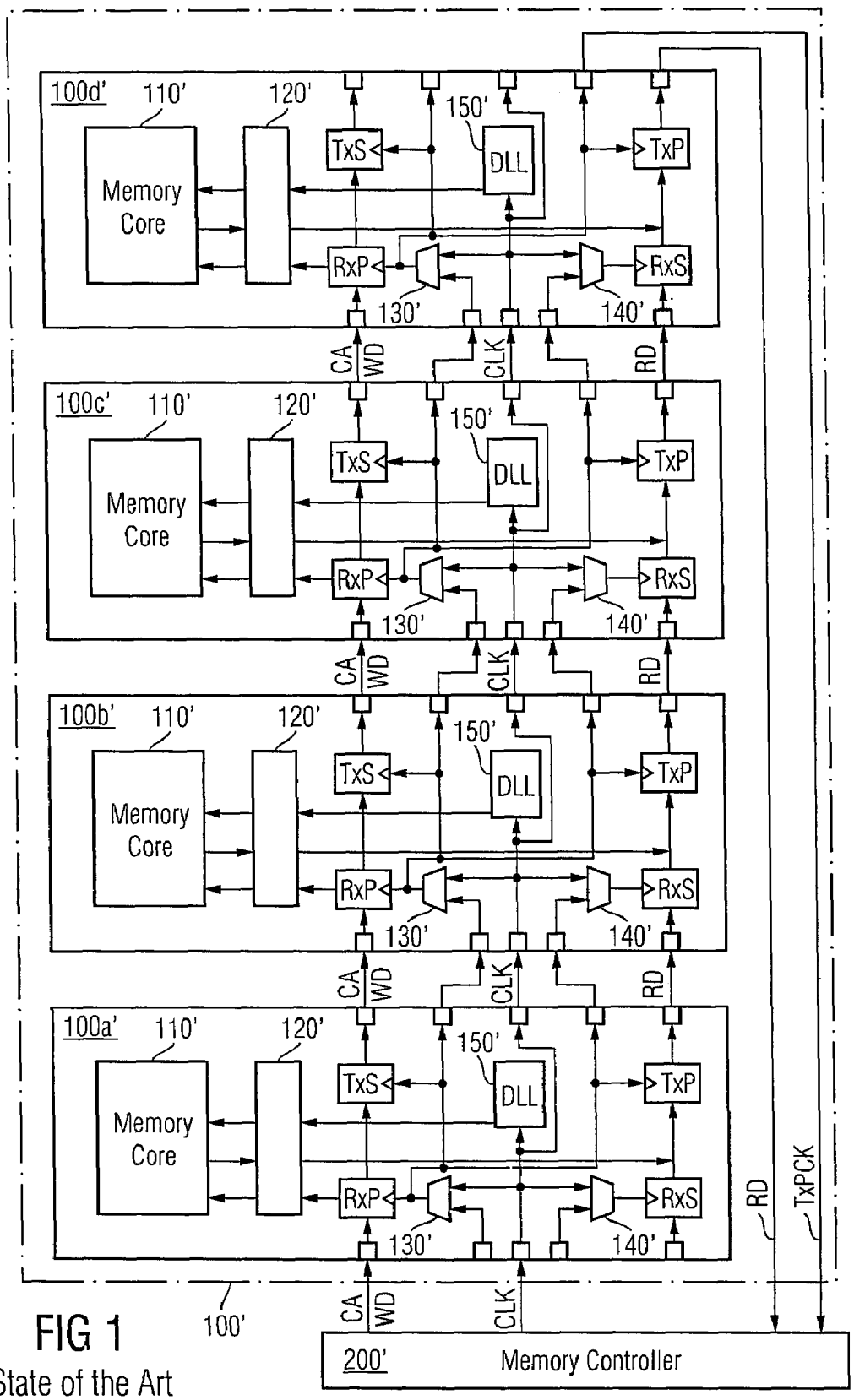
FIG. 1 schematically illustrates a memory device according to the state of the art, FIG. 2 schematically illustrates a memory device according to a first exemplary embodiment of the present invention, FIG. 3 schematically illustrates the memory device of FIG. 1 with a modified clocking arrangement, FIG. 4 schematically illustrates a memory device according to a second exemplary embodiment of the present invention, FIG. 5 schematically illustrates the memory device of FIG. 4 with a modified clocking arrangement, FIG. 6 schematically illustrates a memory device according to a third exemplary embodiment of the present invention, FIG. 7 schematically illustrates a memory device with a modified clocking arrangement, FIG. 8 schematically illustrates a fully digitally implemented phase-locked loop to be used in a memory module according to an embodiment of the invention, FIG. 9 schematically illustrates a further embodiment of a fully digitally implemented phase-locked loop, and FIG. 10 schematically illustrates a digitally controlled oscillator to be used in the phase-locked loop according to FIG. 8 or 9.
Figure 2:
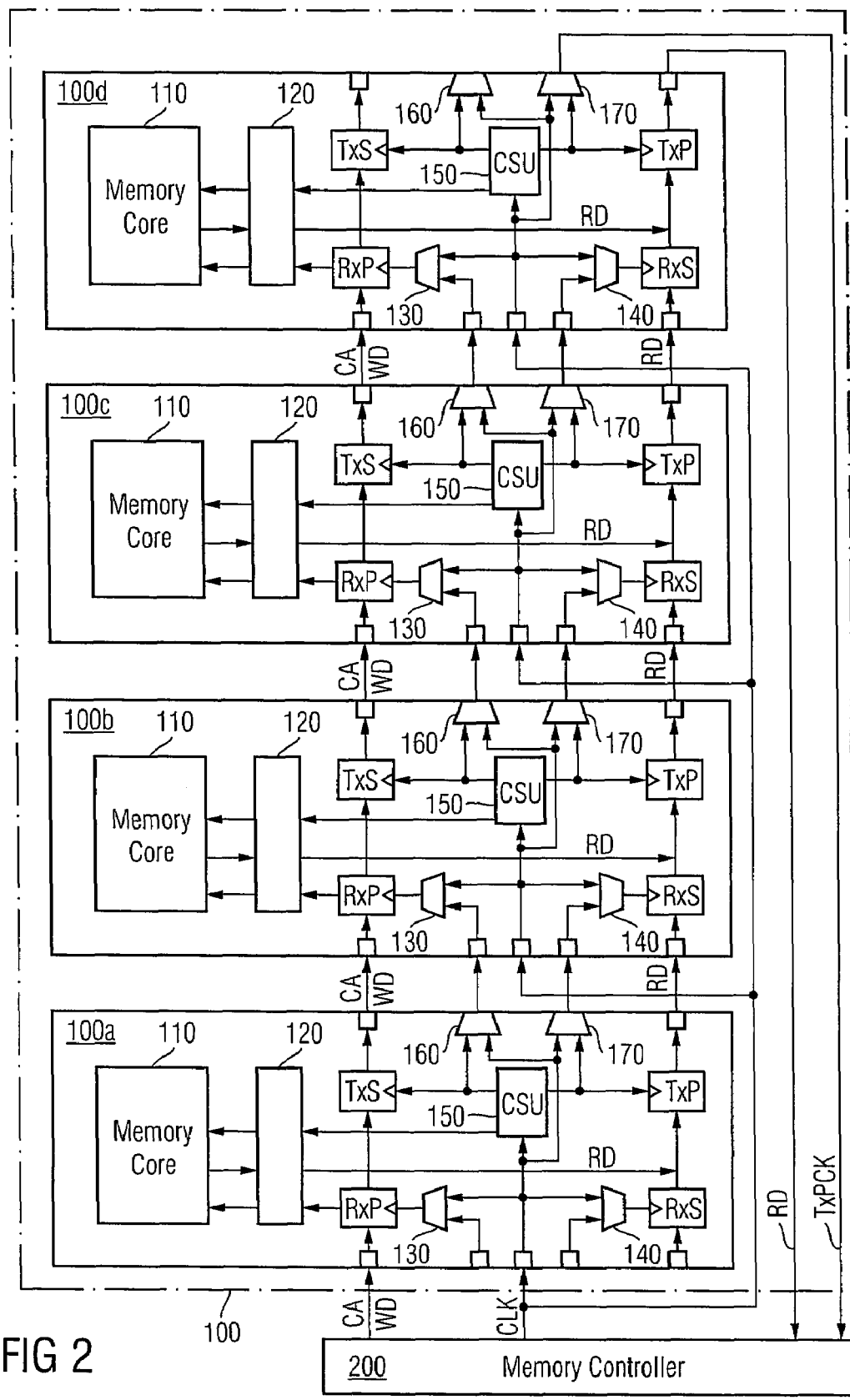

FIG. 2 illustrates a memory device 100 comprising a plurality of memory modules 100a, 100b, 100c, 100d which are connected in series in a loop-forward configuration. A memory controller 200 is provided for connecting the memory device 100 to components of a computer system such as a central processing unit and other devices connected to a system bus (not shown). The memory controller 200 provides to the memory device 100 a command and address signal CA, a write data signal WD, and a clock signal CLK. The memory controller 200 receives from the memory device 100 a read data signal RD and a clock signal TxPCK associated with the read data signal. The command and address signal CA and the write data signal are transmitted via a common digital bus. Therefore, in the following these signals will be referred to as command and write data signal CA, WD.

Each of the memory modules comprises a DRAM-memory core 110, a core interface 120 and circuitry for the transfer of signals. The core interface 120 serves for connecting the memory core 110 to the circuitry for the transfer of signals and for controlling the memory core 110. The core interface 120 may actually have further signal connections to the memory core 110 and to the circuitry for the transfer of signals which for the sake of clarity have not been illustrated in FIG. 2.

In each of the memory modules, the circuitry for the transfer of signals comprises a first or primary receiver RxP for receiving the command and write data signal in the memory module 100a, 100b, 100c, 100d and a first or primary transmitter TxP for transmitting a read data signal RD from the memory module 100a, 100b, 100c, 100d. In addition, a second or secondary receiver RxS is provided for receiving a read data signal RD in the memory module 100a, 100b, 100c, 100d, and a second or secondary transmitter TxS is provided for transmitting the command and write data signal from the memory module 100a, 100b, 100c, 100d.

Each of the primary receiver and transmitter RxP, TxP and the secondary receiver and transmitter RxS, TxS is configured to synchronize the received or transmitted signal to a respective input clock signal.

Further, each of the memory modules comprises the clock synthesizer unit (CSU) 150 for receiving an input clock signal of the memory module 100a, 100b, 100c, 100d and producing as an output signal a regenerated input clock signal. The regenerated input clock signal has a predefined phase relation to the input clock signal and the same frequency. However, in the regenerated input clock signal, damping, distortions and jitter of the input clock signal are compensated for. This is preferably accomplished by means of a phase-locked loop (PLL) of the CSU, as will be described below in more detail.

In the memory device 100 of FIG. 2, the memory modules 100a, 100b, 100c, and 100d are connected in series. The first memory module 100a receives the command and write data signal CA, WD and the clock signal CLK provided by the memory controller 200. The primary receiver RxP synchronizes the received command and write data signal CA, BD to the clock signal CLK. For this purpose, the clock signal CLK provided by the memory controller is used as the input clock signal of the primary receiver RxP. In the memory module 10a, the received command and write data signal CA, WD is forwarded to the secondary transmitter TxS to be further transmitted to the second memory module 100b. Further, the first memory module 100a may generate a read data signal RD according to data stored in the memory core 110 in a read operation from the first memory module 100a. The read data signal RD is then further transmitted to the second memory module 100b via the primary transmitter TxP of the first memory module 100a.

The primary transmitter TxP and the secondary transmitter TxS of the first memory module 100a receive as their input clock signal the regenerated input clock signal of the memory module provided by the CSU. Therefore, the data transmission from the first memory module 100a to the second memory module 100b is accomplished on the basis of a high-quality clock signal.

The input clock signals of the primary transmitter TxP and the secondary transmitter TxS are forwarded to output multiplexers 160, 170. The output multiplexer 170 is configured to selectively output from the first memory module 100a either the input clock signal of the primary transmitter TxP or the input clock signal of the CSU 150. The output multiplexer 160 is configured to selectively output from the first memory module 100a either the input clock signal of the secondary transmitter TxS or the input clock signal of the CSU 150.

In the second memory module 100b, the command and write data signal CA, WD transmitted from the first memory module 100a is received via the primary receiver RxP. The read data signal RD transmitted from the first memory module 100a is received via the secondary receiver RxS. By means of multiplexers 130, 140, the input clock signals of the primary receiver RxP and of the secondary receiver RxS may be selected from either the clock signal CLK provided by the memory controller 200 or the output clock signals provided by the output multiplexers 160, 170 of the first memory module 100a. The selection may be based on the quality of the clock signals. For example, if the output clock signal of the first memory module 100a corresponds to the regenerated input clock signal used as the input clock signal of the primary transmitter TxP or the secondary transmitter TxS, it may have a higher quality than the clock signal CLK provided by the memory controller 200. Further, the inclusion of the multiplexers 130, 140 allows for the same type of memory module to be used in each position of the series of memory modules. For example, in the case of the first memory module 100a where no output clock signals of a memory module located upstream in the series of memory modules are available the clock signal CLK provided by the memory controller 200 can be selected as the input clock signal of the primary receiver RxP.

In the memory device 100 as shown in FIG. 2, the clock signal CLK provided by the memory controller 200 is distributed as an input clock signal to each of the memory modules 100a, 100b, 100c, 100d. In the memory modules 100a, 100b, 100c, 100d, the clock signal CLK is used as the input clock signal of the CSU 150.

The transmission of the command and write data signal CA, WD, the read data signal RD and the output clock signals from one memory module of the series of memory modules to the next memory module, i.e. from the second memory module 100b to the third memory module 100c, and from the third memory module 100c to the fourth memory module 100d is accomplished in the same manner as between the first memory module 100a and the second memory module 100b. From the last memory module of the series of memory modules, i.e. from the fourth memory module 100d, the read data signal RD and an associated clock signal TxPCK is transmitted to the memory controller 200. The clock signal TxPCK associated with the read data signal RD may be selected via the output multiplexer 170 of the fourth memory module 100d to be formed either by the input clock signal of the primary transmitter TxP of the fourth memory module 100d or the input clock signal of the CSU 150 of the fourth memory module 100d. Otherwise, the internal processing of signals in the memory modules 100c and 100d is the same as for the first and second memory modules 100a, 100b.

As shown in FIG. 2, all the memory modules 100a, 100b, 100c, and 100d of the memory device 100 are identically configured. Therefore, all the memory devices comprise the same components, i.e. the primary receiver RxP, the secondary receiver RxS, the primary transmitter TxP, and the secondary transmitter TxS. Further, the multiplexers 130, 140 and the output multiplexers 160, 170 are included in all of the memory modules. Obviously, the secondary receiver RxS is not necessary required in the first memory module 100a. Similarly, the secondary transmitter TxS is not necessarily required in the fourth memory module 100d. In view of flexibility and a unified design and production of the memory modules, it is however considered to be advantageous to provide each of the memory modules 100a, 100b, 100c, and 100d with the same structure. The necessary flexibility to position the memory modules at different locations in the loop-forward configuration is achieved by the multiplexers 130, 140 and the output multiplexers 160, 170.

As can be seen, the data transfer in the memory device 100 of FIG. 2 is essentially based on point-to-point-connections. The command and write data signals CA, WD is transmitted from the memory controller to the first memory module, from there to the next memory module, and so on until the last memory module is reached. The read data signal RD is generated in one of the memory modules, transmitted to the next memory module and so on, and from the last memory module the read data signal is transmitted to the memory controller. The clock signal CLK is distributed from the memory controller 200 to each of the memory modules 100a, 100b, 100c, 100d.

The arrangement as shown in FIG. 2 has the advantage that each of the memory modules 100a, 100b, 100c, 100d has the same overall latency with respect to receiving commands and data from the memory controller 200 and transmitting data to the memory controller 200. For example, the first memory module 100a has the shortest latency with respect to receiving commands and data from the memory controller 200 using the command and write data signal CA, WD, whereas it has the longest latency with respect to transmitting data to the memory controller 200 using the read data signal RD.

Moreover, the data transfer between the components of the memory device 100 has to be synchronized to the clock signal CLK provided by the memory controller 200 only locally for each connection between the different components, i.e. separately for each point-to-point connection. Thereby the overall requirements for synchronizing the command and write data signal CA, WD and the read data signals RD to the clock signal CLK are less strict and a higher performance can be achieved. For this, it is important that the command and write data signal CA, WD transmitted from one memory module to the next memory module and the read data signal RD transmitted from one memory module to the next memory module and from the last memory module to the memory controller 200 are synchronized to a high-quality clock signal which is provided by the CSU 150. By means of the CSU 150 a degradation of the clock signals used for transmitting the signals from the memory modules 100a, 100b, 100c, 100d as compared to the clock signal CLK provided by the memory controller 200 is compensated for.

In the clocking arrangement as shown in FIG. 2, the clock signal CLK provided by the memory controller 200 is distributed to each of the memory modules 100a, 100b, 100c, 100d. Therefore, the arrangement as shown in FIG. 2 may be regarded as a source synchronous system in which the memory controller 200 is both the source of the command and write data signal CA, WD and of the clock signal CLK.

Figure 3:
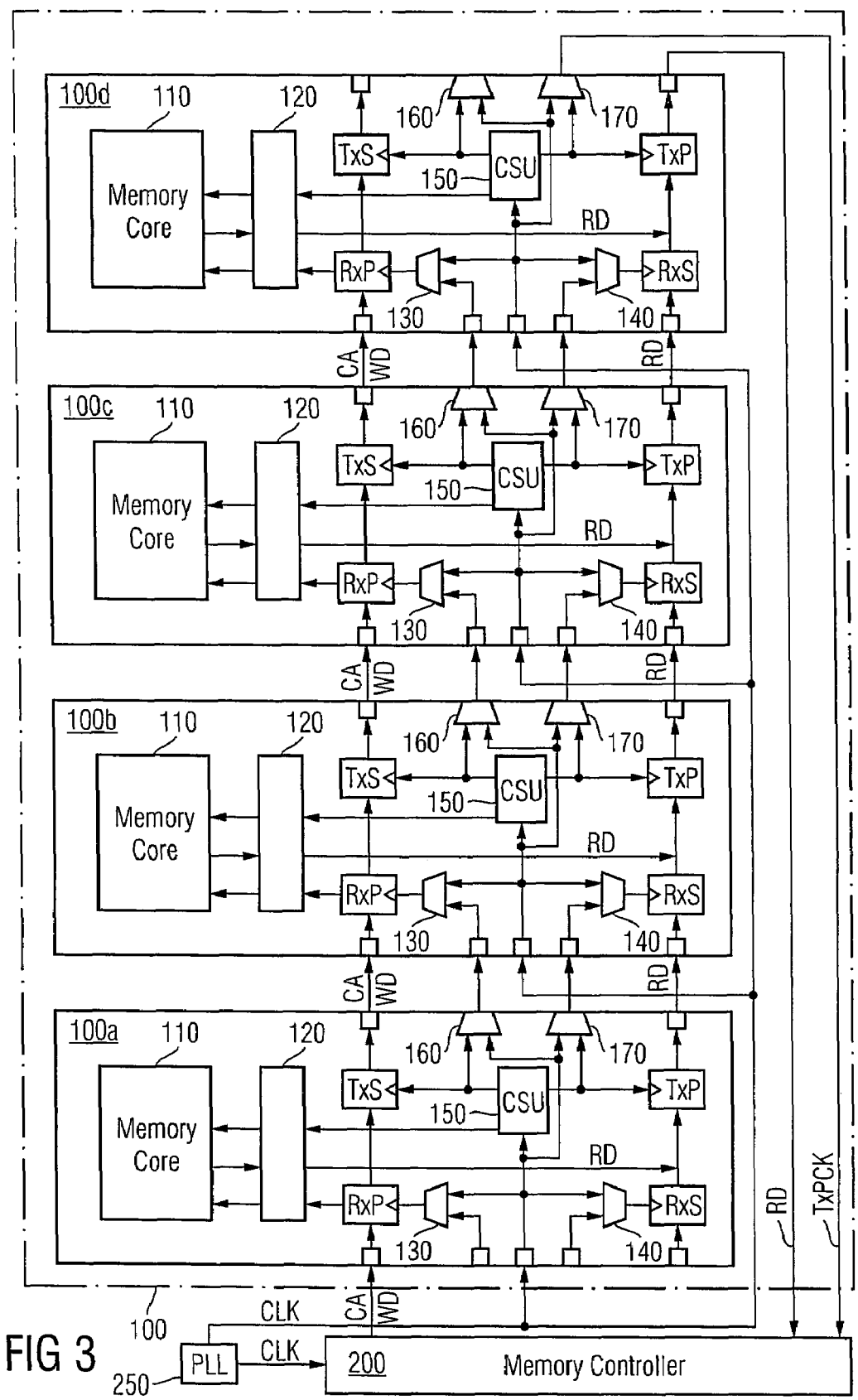

FIG. 3 shows the memory device 100 with a modified clocking arrangement. Generally, the arrangement as shown in FIG. 3 corresponds to that of FIG. 2. Components shown in FIG. 3 which correspond to that of FIG. 2 are designated with the same reference signs and in the following a more detailed description thereof will be omitted.

As compared to the clocking arrangement shown in FIG. 2, in the arrangement of FIG. 3 the clock signal CLK is provided to the memory device 100 from a PLL 250 which is arranged externally with respect to the memory controller 200.

Further, the PLL 250 supplies the clock signal CLK to the memory controller 200. This allows for synchronizing internal clock signals of the memory controller 200 to the clock signal CLK. In particular, the command and write data signal CA, WD which is transmitted from the memory controller 200 to the memory device 100 is generated on the basis of a clock signal derived from the clock signal CLK provided by the PLL 250.

The PLL 250 may be a separate component which is provided on the main board of a computer system and is preferably fully digitally implemented so as to provide the clock signal CLK with a high quality and without requiring excessive outlay. The clocking arrangement as illustrated in FIG. 3 is also referred to as a mesosynchronous system.

Figure 4:
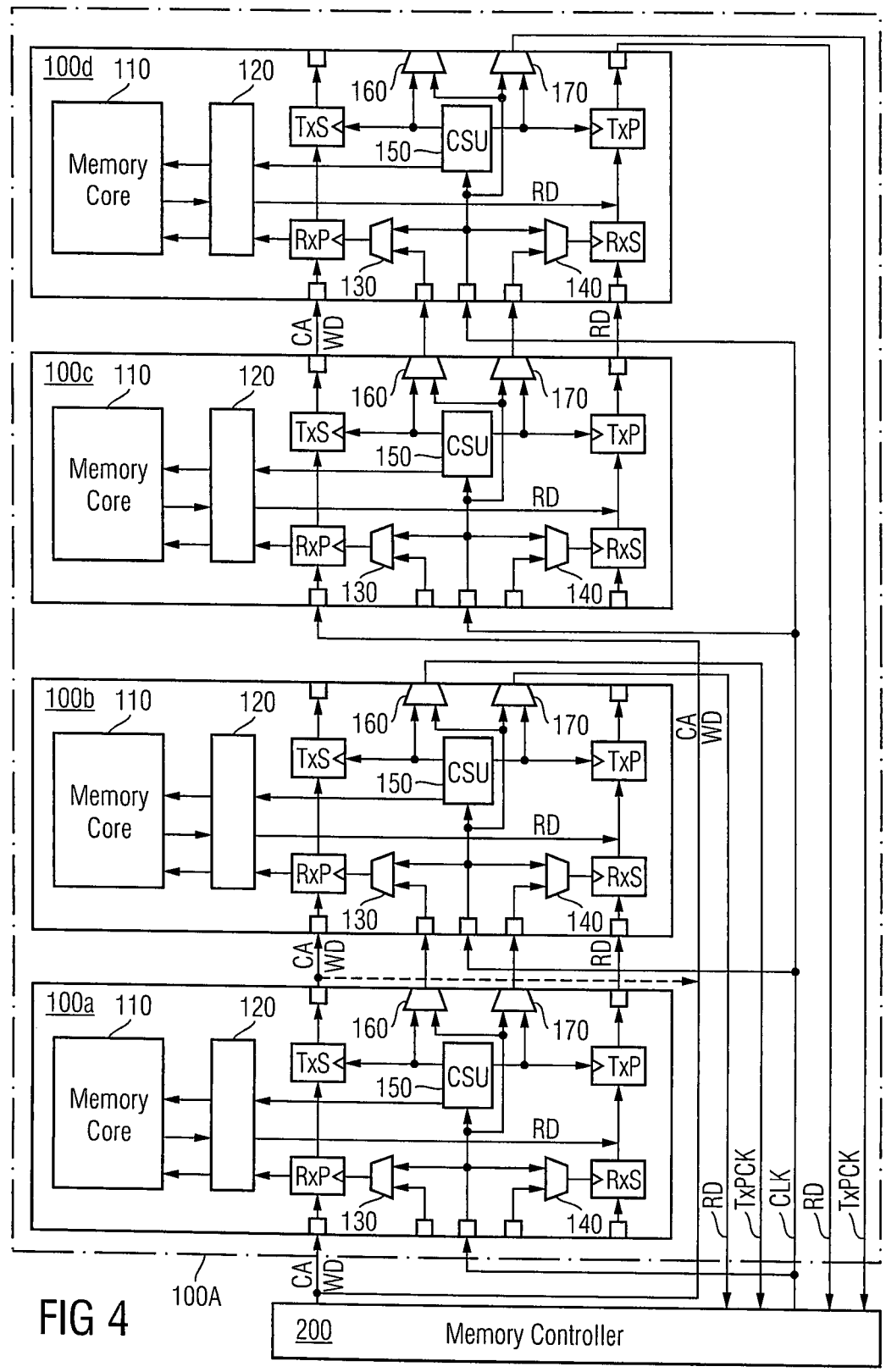

FIG. 4 shows a further memory device 100A in which memory modules 100a, 100b, 100c, and 100d are arranged according to a loop-forward configuration. The memory modules 100a, 100b, 100c, and 100d correspond to those which have already been described in connection with FIGS. 2 and 3. Components corresponding to those which have already been explained in connection with FIGS. 2 and 3 are designated with the same reference signs and further description thereof will be omitted.

In the memory device 100A of FIG. 4, the memory controller 200 provides to the memory device 100A the command and write data signal CA, WD and the clock signal CLK. The memory controller 200 receives from the memory device 100A a pair of read data signals RD and associated clock signals TxPCK.

In the memory device 100A of FIG. 4, the first memory module 100a and the second memory module 100b constitute a first series of memory modules and the third memory module 100c and the fourth memory module 100d constitute a second series of memory modules. The transmission of the command and write data signal CA, WD from the memory controller 200 to the first memory module 10a and from the first memory module 100a to the second memory module 100b corresponds to that as already described for the first and second memory module 100a and 100b of the memory device 100 as shown in FIG. 2. However, from the second memory module 100b, which constitutes the last memory module of the first series of memory modules, the read data signal RD and the associated clock signal TxPCK are transmitted to the memory controller.

The third memory module 100c, which constitutes a first memory module of the second series of memory modules, receives its command and write data signal CA, WD either from the memory controller 200 or from the first memory module 100a (as indicated by the dashed arrow). The transfer of the command and write data signal CA, WD and the read data signal RD from the third memory module 100c to the fourth memory module 100d is as explained for the first memory module 100a and the second memory module 100b of FIG. 2. Also, the internal processing of the signals in the memory modules 100a, 100b, 100c, and 100d corresponds to that as already explained with reference to FIG. 2.

The read data signal RD transmitted from the fourth memory module 100d, which constitutes the last memory module of the second series of memory modules, and the associated clock signal TxPCK is transmitted to the memory controller 200.

As can be seen, the arrangement illustrated in FIG. 4 comprises two series of memory modules which each have an associated loop-forward data path. The loop-forward data paths of the two series of memory modules are connected in parallel.

As compared to the memory device 100 of FIG. 2, the overall latency for each of the memory modules 100a, 100b, 100c, and 100d is reduced. The concept may of course be extended to a larger number of memory modules in each of the series of memory modules or to further series of memory modules and associated loop-forward data paths. The concept may be employed to reduce the overall latency of each memory module as compared to an arrangement having the same number of memory modules and only one loop-forward data path, or to include a larger number of memory modules into the memory device without incurring an increased latency.

In the alternative configuration of FIG. 4 which is indicated by the dashed arrow, the command and write data signal CA, WD is provided to the first memory module of the second series of memory modules, i.e. the third memory module 100c, from the first memory module of the first series of memory modules, i.e. from the first memory module 100a. In this configuration, the first memory module 100a serves as a master memory module of the memory device 100A. Distributing the command and write data signal CA, WD from the master memory module instead of the memory controller 200 may provide advantages as to the signal quality, as shorter distances are involved in distributing the command and write data signal CA, WD.

Figure 5:
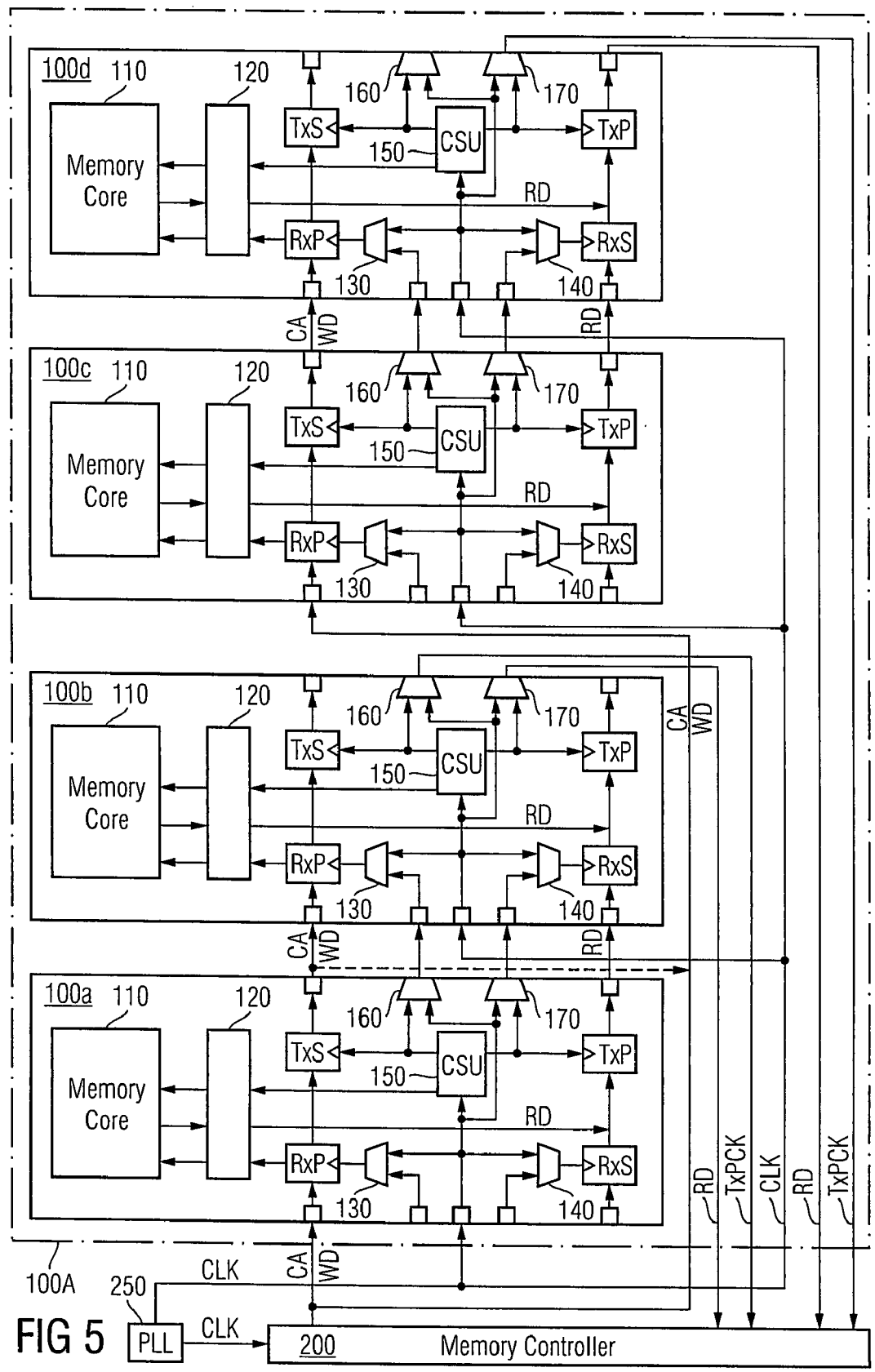

FIG. 5 shows the memory device 100A with a modified clocking arrangement of the mesosynchronous type. Generally, the arrangement as shown in FIG. 5 corresponds to that of FIG. 4. Components shown in FIG. 5 which correspond to that of FIG. 4 are designated with the same reference signs and in the following a more detailed description thereof will be omitted.

As compared to the arrangement shown in FIG. 4, in the arrangement of FIG. 5 the clock signal CLK is provided to the memory device 100A from a PLL 250 which is arranged externally with respect to the memory controller 200. Further, the PLL 250 supplies the clock signal CLK to the memory controller 200. This allows for synchronizing internal clock signals of the memory controller 200 to the clock signal CLK. In particular, the command and write data signal CA, WD which is transmitted from the memory controller 200 to the memory device 100A is generated on the basis of a clock signal derived from the clock signal CLK provided by the PLL 250.

The PLL 250 may be a separate component which is provided on the main board of a computer system and is preferably fully digitally implemented so as to provide the clock signal CLK with a high quality and without requiring excessive outlay.

Figure 6:
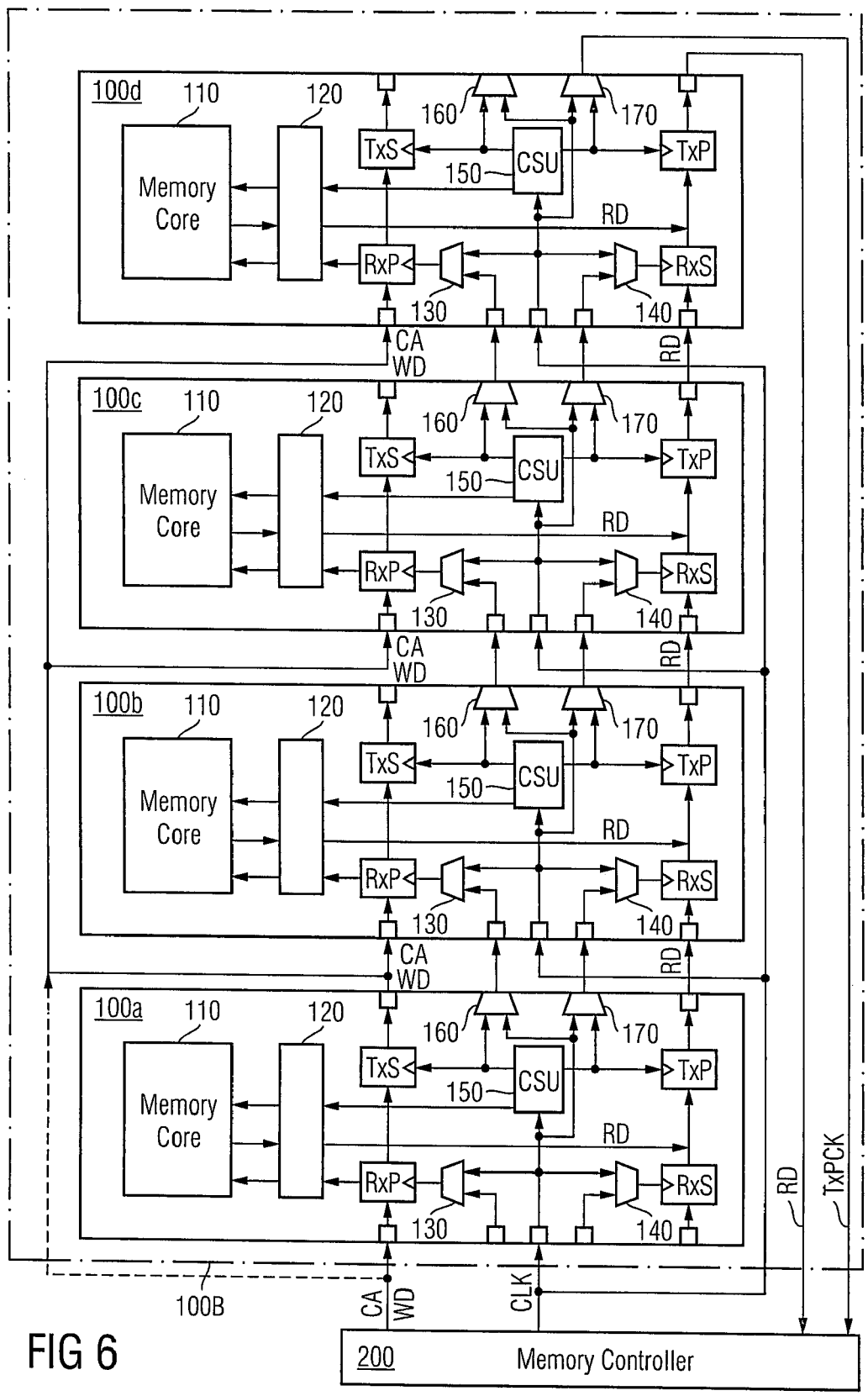

FIG. 6 shows a further memory device 100B in which memory modules 100a, 100b, 100c, 100d are arranged according to a loop-forward configuration. In FIG. 6, components corresponding to those already explained with reference to FIGS. 2-5 have been designated with the same reference signs and further description thereof will be omitted in the following.

The memory modules 100a, 100b, 100c, and 100d of the memory device 100B correspond to those of the memory device 100 described with reference to FIG. 2. As compared to the memory device 100 of FIG. 2, the memory device 100B uses the same type of transmission for the read data signal RD, from one memory module to the next memory module and from the last memory module of the series of memory modules, i.e. from the fourth memory module 100d, to the memory controller 200, but uses a different type of distribution for the command and write data signal CA, WD.

In the memory device 100B of FIG. 6 the command and write data signal CA, WD is distributed according to a so-called fly-by system. The command and write data signal CA, WD is transmitted from the memory controller 200 to the first memory module of the series of memory modules, i.e. to the first memory module 100a. From the corresponding signal output of the first memory module 10a, i.e. form the secondary transmitter TxS, the command and write data signal CA, WD is distributed to the other memory modules of the series of memory modules, i.e. to the second memory module 100b, the third memory module 100c and the fourth memory module 100d. In this configuration, the first memory module 100a serves as a master memory module for distributing the command and write data signal CA, WD to the other memory modules.

According to an alternative configuration indicated by the dashed arrow in FIG. 6, the command and write data signal CA, WD provided by the memory controller may be directly distributed to all memory modules of the memory device 100B. As already described with reference to FIG. 4, the configuration using a master memory module may however provide advantages as to the signal quality of the command and write data signal CA, WD received in the other memory modules 100b, 100c, and 100d.

Figure 7:
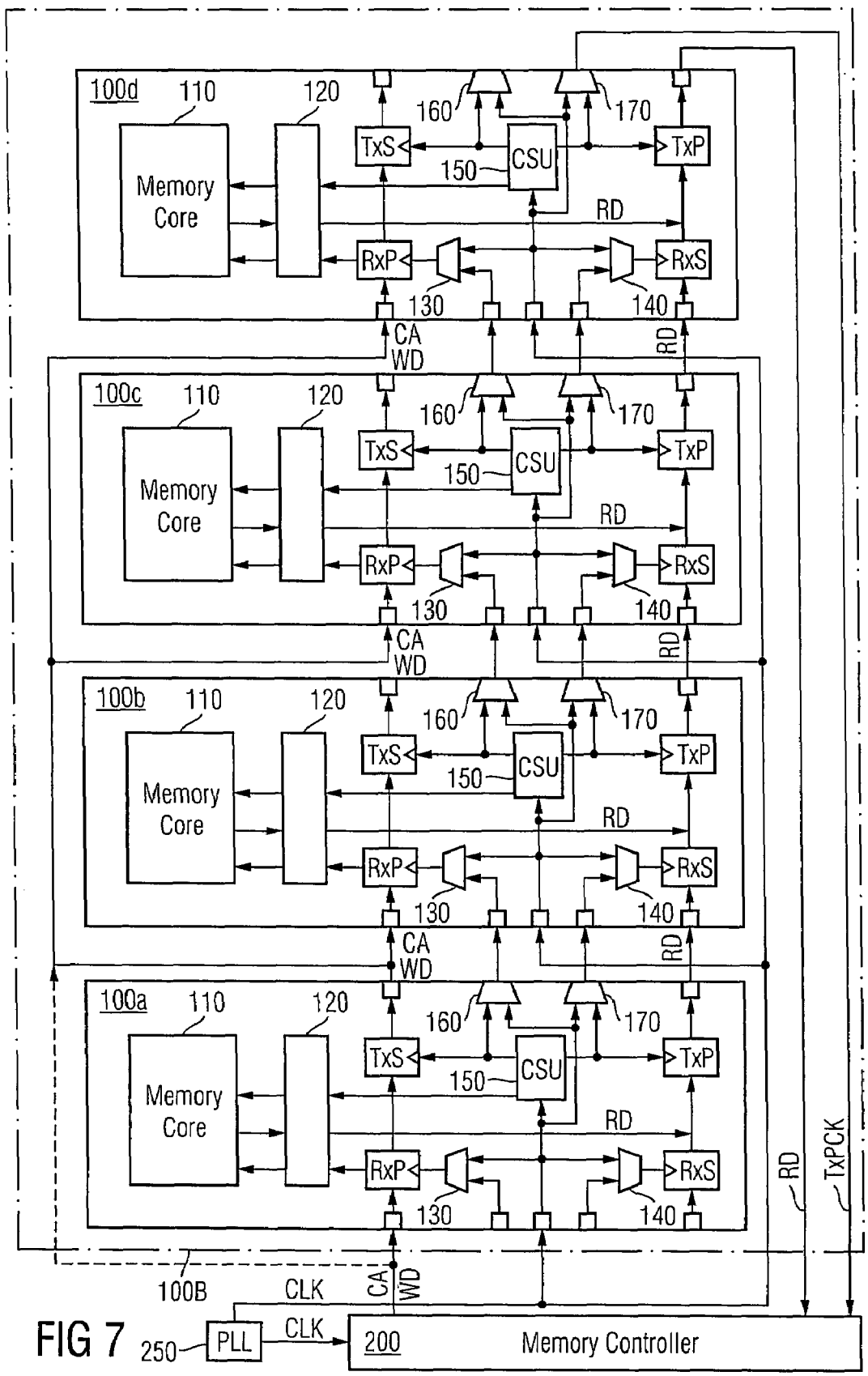

FIG. 7 shows the memory device 100B with a modified clocking arrangement of the mesosynchronous type. Generally, the arrangement as shown in FIG. 7 corresponds to that of FIG. 6. Components shown in FIG. 7 which correspond to that of FIG. 6 are designated with the same reference signs and in the following a more detailed description thereof will be omitted.

As compared to the arrangement shown in FIG. 6, in the arrangement of FIG. 7 the clock signal CLK is provided to the memory device 100B from a PLL 250 which is arranged externally with respect to the memory controller 200. Further, the PLL 250 supplies the clock signal CLK to the memory controller 200. This allows for synchronizing internal clock signals of the memory controller 200 to the clock signal CLK. In particular, the command and write data signal CA, WD which is transmitted from the memory controller 200 to the memory device 100 is generated on the basis of a clock signal derived from the clock signal CLK provided by the PLL 250.

The PLL 250 may be a separate component which is provided on the main board of a computer system and is preferably fully digitally implemented so as to provide the clock signal CLK with a high quality and without requiring excessive outlay.

As already mentioned above, the CSU 150 of the memory modules 100a, 100b, 100c, 100d preferably comprises a PLL for producing the regenerated input clock signal. Preferably, the PLL is fully digitally implemented, thereby achieving a high signal quality of the regenerated input clock signal without requiring an excessive amount of analog components which in some cases are difficult to integrate into the digital structure of the memory module.

Figure 8:
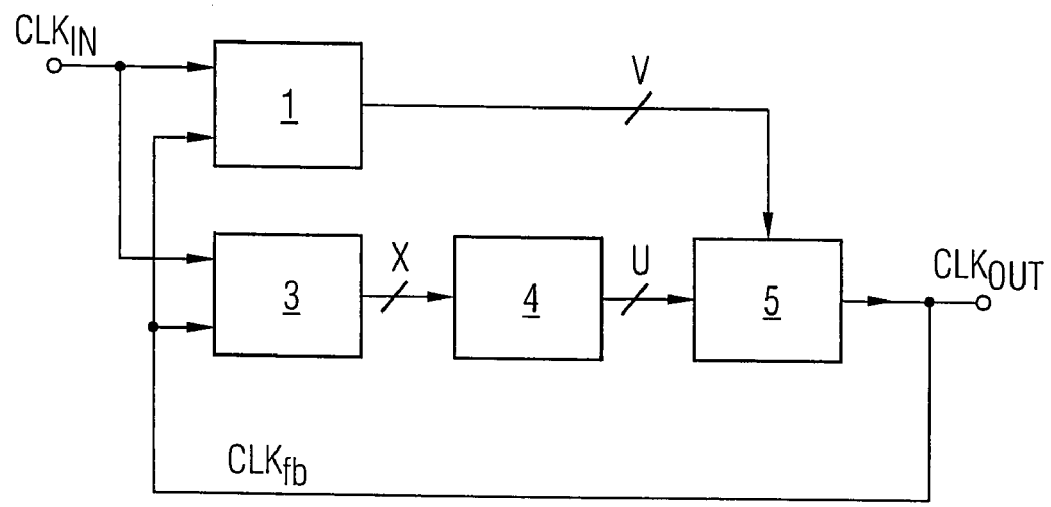

An example of a fully digitally implemented PLL to be used within the CSU of the memory module 100a, 100b, 100c, 100d is shown in FIG. 8. In the illustrated PLL, an input clock signal $CLK_{IN}$ is supplied to a digital frequency difference detector 1 and a digital phase detector 3. Further, a feedback clock signal $CLK_{fb}$ is supplied to the frequency detector 1 and the phase detector 3.

The frequency difference detector 1 produces a digital frequency difference signal V which represents a frequency difference between the frequency of the input clock signal $CLK_{IN}$ and the frequency of the feedback clock signal $CLK_{fb}$. Correspondingly, the phase detector 3 produces a digital phase difference signal X which represents a phase difference between the input clock signal $CLK_{IN}$ and the feedback clock signal $CLK_{fb}$.

The frequency difference signal V is supplied to a first control input of a digitally controlled oscillator 5. The phase difference signal X is supplied to a digital loop filter 4, e.g. a proportional-integral-filter (PI-filter). The filtered phase difference signal U is supplied to a second control input of the digitally controlled oscillator 5. The digitally controlled oscillator 5 produces an output clock signal $CLK_{OUT}$ having a frequency which is determined by the frequency difference signal V and the filtered phase difference signal U.

As the filtered phase difference signal U and the frequency difference signal V are directly used for controlling the digitally controlled oscillator 5, no digital-analog-converter is necessary. Thereby, a shorter latency in the phase-locked loop and reduced noise of the output clock signal $CLK_{OUT}$ are achieved. Generally, a very fast control of the PLL is possible.

Figure 9:
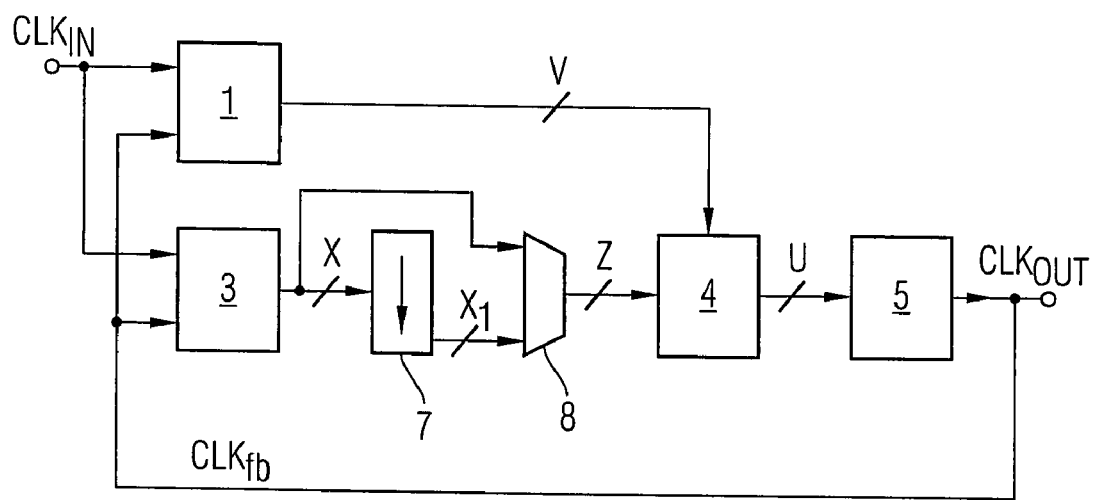

FIG. 9 schematically shows a second example of a PLL to be used within the CSU 150. The PLL shown in FIG. 9 corresponds in many aspects to the PLL of FIG. 8, and corresponding components have been designated with the same reference signs. In the following, only the differences as compared to the PLL of FIG. 8 are explained.

In addition to the components already described to FIG. 8, the PLL of FIG. 9 comprises a decimator 7 and a multiplexer 8 which are arranged between the phase detector 3 and the digital loop filter 4, as it is shown in FIG. 9. The decimator 7 is supplied with the phase difference signal x and generates therefrom a decimated phase difference signal $X_1$. The decimated phase difference signal $X_1$ has, as compared to the phase difference signal X, a lower sampling rate. By means of the multiplexer 8, it can be selected whether the digital filter 4 is supplied with the phase difference signal X or with the decimated phase difference signal $X_1$ as a phase difference signal Z. Selection of the decimated phase difference signal $X_1$ as the phase difference signal Z is particularly useful if the frequency of the input clock signal $CLK_{IN}$ is very large. In this case, the loop filter 4 only has to operate at a lower clock frequency which simplifies the realization. At lower frequencies of the input clock signal CLK in the phase difference signal X can be used as the phase difference signal Z.

According to a further modification with respect to FIG. 8, the frequency difference signal V is also supplied to the digital loop filter 4, and the signal U is generated in response to the phase difference signal Z and the frequency difference signal V. In this case, the digitally controlled oscillator 5 requires only one control input.

The above two modifications with respect to the phase-locked loop of FIG. 8 can be realized independently of each other.

Figure 10:
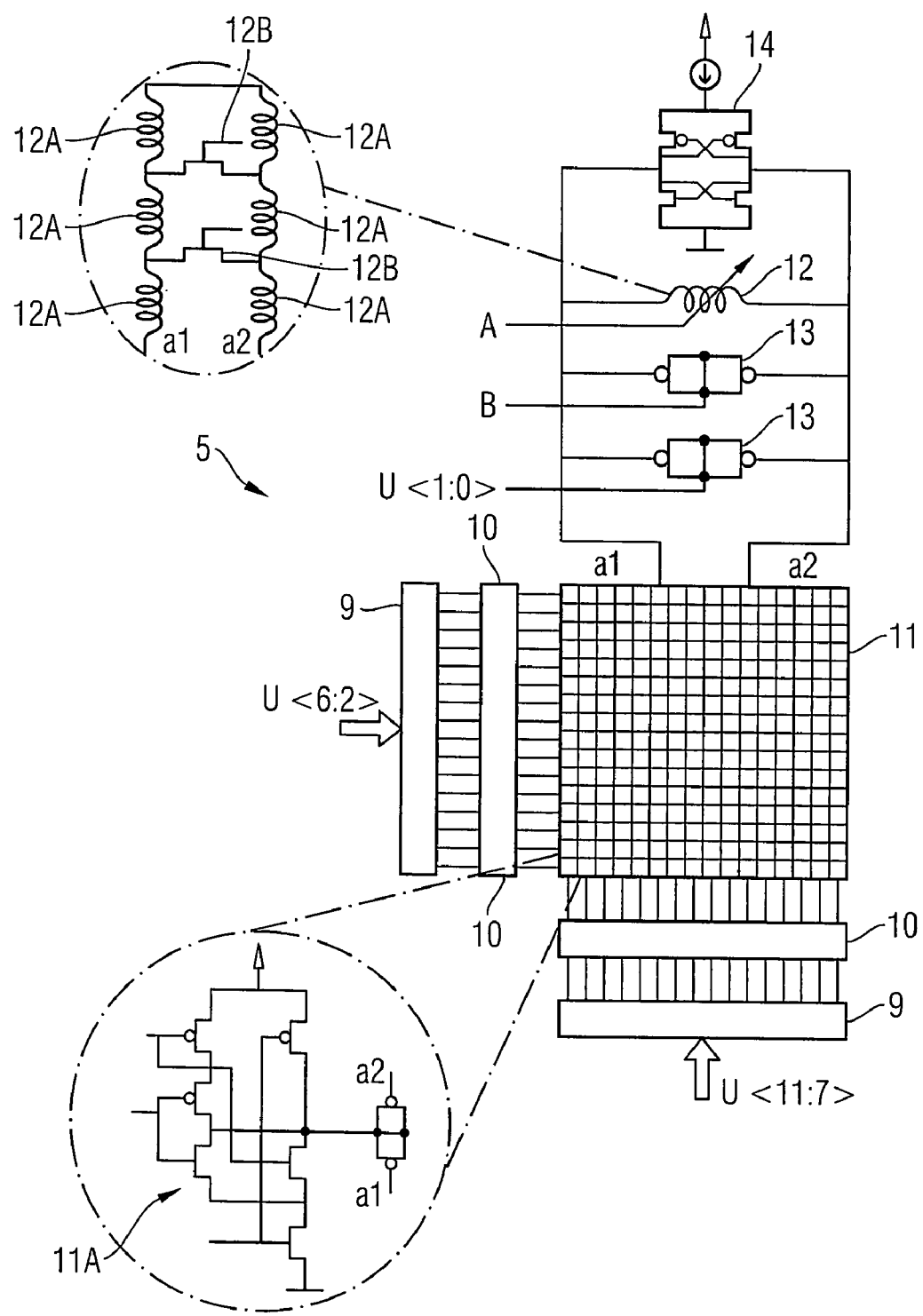

FIG. 10 shows schematically the structure of a digitally controlled oscillator 5 as used in FIGS. 8 and 9. For the illustration of FIG. 10, it is assumed that a single control signal U is supplied to the digitally controlled oscillator, as described with reference to FIG. 9. By way of example, the control signal U has a width of 12 bit. In the illustrated example, the bits are enumerated from 0 to 11, 0 being the number of the bit having the lowest value and 11 being the number of the bit having the highest value.

For generating the output clock signal $CLK_{OUT}$ there is provided a resonant circuit which essentially consists of an inductor 12 and capacitors 11 and 13. The resonant circuit is supplied from a current source 14.

In the illustrated example, bits 2 to 6 and bits 7 to 11 are each separately supplied to thermometer coders 9 which generate a thermometer code corresponding to the supplied binary code. This thermometer code is in each case stored in a latch 10 so as to compensate for differences in the signal run times within the thermometer coders 9. According to the output signal of the latches 10, a matrix 11 of varactor diodes 11A is controlled, i.e. the varactor diodes are activated or deactivated in response to the signals provided by the latches 10, thereby changing the overall capacitance of the resonant circuit. A possible realization of the varactor diodes 11A from transistors is shown in an enlarged part of FIG. 10, the outputs a1, a2 of the varactor diodes being connected to the corresponding lines a1, a2 of the resonant circuit. However, any type of switchable capacitor can be used without limitation to the structure as illustrated in FIG. 10.

The two lowermost bits 0 and 1 of the signal U are used to directly control binary weighted varactor diodes 13.

Accordingly, it is possible to modify the capacitance of the resonant circuit of the digitally controlled oscillator 5 by changing the signal U, thereby changing the frequency of the output clock signal $CLK_{OUT}$.

Further, initialization signals A and B can be supplied to the digitally controlled oscillator 5 of FIG. 10. Here, the initialization signal B controls further varactor diodes 13, whereas the initialization signal A serves for controlling the inductance 12. By means of the initialization signals A and B, a frequency range can be selected in which the digitally controlled oscillator 5 operates. This can, for example, be accomplished in response to the frequency of the input clock signal $CLK_{IN}$.

A further enlarged part of FIG. 10 shows the structure of the inductor 12. In the illustrated example, the inductor 12 comprises six separate inductors 12A and two switches 12B realized from transistors, which are switched in response to the initialization signal A, thereby changing the overall inductance of the arrangement.

A fully digitally implemented PLL as described with reference to FIGS. 8 to 10 is preferably employed in the CSU 150 of the memory modules 100a, 100b, 100c, and 100d of the memory devices 100, 100A, and 100B described above. In this case, the input clock signal $CLK_{IN}$ of the PLL is formed by the input clock signal of the CSU and the output clock signal $CLK_{OUT}$ of the phase-locked loop forms the regenerated input clock signal.

As by means of the phase-locked loop the input clock signal of the CSU 150 is newly synthesized, it has a very high quality, i.e. low noise, low jitter and a low degree of distortion.

As an alternative to the phase-locked loop, the CSU may also comprise a delay-locked loop. As compared to a phase-locked loop, a delay-locked loop does not completely newly synthesize its input clock signal. However, also a delay-locked loop may help to reduce some disturbances in the input clock signal, thereby providing an output signal which has an improved signal quality.

Further, the PLL as described in connection with FIGS. 8 to 10 may be employed as the PLL 250 for providing the clock signal CLK to the memory device 100, 100A, and 100B, as shown in FIGS. 3, 5, and 7. In this case, the input clock signal of the PLL may be provided by a quartz oscillator and may have a lower frequency than the clock signal CLK, which is internally multiplied in the PLL.

In FIGS. 2 to 7, all the memory modules are shown to have an identical configuration. In this case, some of the memory modules comprise components which are not necessary to achieve the desired operation of the memory module. For example, the last memory module of a series of memory modules must not necessarily comprise the secondary transmitter TxS. Further, the secondary receiver RxS is not necessary for the first memory module of a series of memory modules. In case of using a fly-by system for the command and write data signal CA, WD as illustrated in FIGS. 6 and 7, the secondary transmitter TxS could be omitted for at least some of the memory modules.

The memory modules 100a, 100b, 100c, and 100d are preferably each implemented on a single semiconductor chip. The memory modules 100a, 100b, 100c, and 100d can then be combined on a printed circuit board to form the memory device 100, 100A or 100B. However, it is also possible to implement two or more of the memory modules 100a, 100b, 100c, and 100d, or even all of them, on a single semiconductor chip.

As it will be apparent to those skilled in the art from the foregoing description, various modifications can be made therein without departing from the scope of the invention. In particular, the different concepts illustrated in FIGS. 2 to 7 may be combined with each other in a single memory device. Also, the number of memory modules in a memory device is not limited.

LIST OF REFERENCE SIGNS

| | |
|---|---|
| 1 | frequency difference detector |
| 3 | phase detector |
| 4 | digital filter |
| 5 | digitally controlled oscillator |
| 7 | decimator |
| 8 | multiplexer |
| 9 | thermometer coder |
| 10 | latch |
| 11 | varactor matrix |
| 11A | varactor diode |
| 12, 12A | inductor |
| 12B | switch |
| 13 | varactor diode |
| 14 | current source |
| 100, 100', 100A, 100B | memory device |
| 100a, 100a' | first memory module |
| 100b, 100b' | second memory module |
| 100c, 100c' | third memory module |
| 100d, 100d' | fourth memory module |
| 110, 110' | memory core |
| 120, 120' | core interface |
| 130, 130', 140, 140' | multiplexer |
| 150 | clock synthesizer unit |
| 150' | delay-locked loop |
| 160, 170 | output multiplexer |
| 200, 200' | memory controller |
| 250 | phase-locked loop |
| A, B | initialization lines |
| a1, a2 | lines |
| CLK | clock signal |
| $CLK_{IN}$ | input clock signal |
| $CLK_{OUT}$ | output clock signal |
| $CLK_{fb}$ | feedback clock signal |
| CA, WD | command and write data signal |
| RD | read data signal |
| TxPCK | associated clock signal |
| RxP | primary receiver |
| RxS | secondary receiver |
| TxP | primary transmitter |
| TxS | secondary transmitter |
| V | frequency difference signal |
| X | phase difference signal |
| $X_1$ | decimated phase difference signal |
| Z | phase difference signal |
| U | filtered phase difference signal |

The invention claimed is:

1. A method of operating a memory device, the memory device including at least one memory module, the method comprising:
   a) receiving a command and write data signal in a first memory module;
   b) transmitting a read data signal from the first memory module;
   c) receiving an input clock signal in the first memory module;
   d) regenerating the input clock signal in a clock synthesizer unit of the memory module to produce a regenerated input clock signal of the first memory module, wherein the clock synthesizer unit comprises a digitally implemented phase-locked loop,
   e) synchronizing the read data signal transmitted from the first memory module to the regenerated input clock signal of the first memory module;
   and wherein said regenerating of the input clock signal further comprises,
      generating a digital phase difference signal on the basis of an input clock signal of the phase-locked loop and a feedback clock signal,
      receiving the phase difference signal, and
      controlling a digitally controlled oscillator in response to the filtered phase difference signal.

2. The method according to claim 1, further comprising: receiving the transmitted read data signal in a memory controller.

3. The method according to claim 1, further comprising: generating the input clock signal using a phase-locked loop.

4. The method according to claim 3, wherein the phase-locked loop includes a digitally controllable oscillator.

5. The method according to claim 1, further comprising generating a clock signal for a memory core of the first memory module, the clock signal comprising an output signal of the clock synthesizer unit.

6. The method according to claim 1, wherein the at least one memory module comprises a series of memory modules, and wherein the method further comprises:
   receiving the read data signal in the second memory module;
   transmitting the read data signal from the second memory module;
   regenerating a second memory module input clock signal in the second memory module; and synchronizing the read data signal transmitted from the second memory module with the regenerated second memory module input clock signal.

7. The method according to claim 6, further comprising:
transmitting the command and write data signal from the first memory module to the second memory module; and
receiving the command and write data signal in the second memory module.

8. The method according to claim 6, further comprising:
receiving the read data signal transmitted from a last memory module of the series of memory modules in a memory controller.

9. The method according to claim 6, further comprising:
generating the input clock signals of all memory modules of the series of memory modules using a phase-locked loop.

10. The method according to claim 1, further comprising:
generating the read data signal according to data stored in a memory core of the first memory module.

11. A memory module comprising:
a first receiver configured to receive a command and write data signal in the memory module,
a first transmitter configured to transmit a read data signal from the memory module, and
a clock synthesizer unit configured to regenerate an input clock signal of the memory module,
wherein the first transmitter is configured to transmit the read data signal such that the read data signal is synchronized with the regenerated input clock signal; and
wherein the clock synthesizer unit comprises a digitally implemented phase-locked loop comprising
a phase detector configured to generate a phase difference signal depending on an input clock signal of the phase-locked loop and a feedback clock signal,
a digital filter configured to receive the phase difference signal and to generate a filtered phase difference signal, and
a digitally controlled oscillator controlled in response to the filtered phase difference signal.

12. The memory module according to claim 11, further comprising:
a second receiver configured to receive the read data signal into the memory module.

13. The memory module according to claim 11, further comprising:
a second transmitter configured to transmit the command and write data signal from the memory module, the transmitted command and write data signal being synchronized with the regenerated input clock signal of the memory module.

14. The memory module according to claim 11, wherein the phase-locked loop further comprises:
a frequency difference detector configured to generate a frequency difference signal depending on the input clock signal of the phase-locked loop and the feedback clock signal,
wherein the phase-locked loop is configured to control the digitally controlled oscillator also in response to the frequency difference signal.

15. The memory module according to claim 11, further comprising:
a memory core configured to store data,
wherein the clock synthesizer unit is configured to provide a clock signal to the memory core.

16. The memory module according to claim 15, wherein the clock signal provided to the memory core is phase-shifted with respect to the input clock signal.

17. The memory module according to claim 11, wherein the first transmitter is configured to transmit the read data signal from the memory module, the read data signal generated according to data stored in a memory core of the memory module.

18. The memory module according to claim 11, wherein the memory module is implemented on a single semiconductor chip.

19. A memory device comprising at least a first and a second memory module, each memory module comprising:
a first receiver configured to receive a command and write data signal into the memory module;
a first transmitter configured to transmit a read data signal from the memory module;
a clock synthesizer unit configured to regenerate an input clock signal,
wherein at least the second memory module further comprises a second receiver configured to receive the read data signal transmitted from the first memory module;
wherein each memory module is configured to synchronize the read data signal transmitted from the memory module to the regenerated input clock signal of the memory module, and
wherein the clock synthesizer unit comprises a digitally implemented phase-locked loop comprising
a phase detector configured to generate a phase difference signal depending on an input clock signal of the phase-locked loop and a feedback clock signal,
a digital filter configured to receive the phase difference signal and to generate a filtered phase difference signal, and
a digitally controlled oscillator controlled in response to the filtered phase difference signal.

20. The memory device according to claim 19, wherein the first memory module is configured to receive the command and write data signal from a memory controller.

21. The memory device according to claim 19, wherein the second memory module is a last memory module of the series of memory modules in the memory device, and is configured to transmit the read data signal to a memory controller.

22. The memory device according to claim 19, further comprising:
a first series of memory modules having a first pair of said first memory module and said second memory module and a second series of memory modules having a second pair of said first memory module and said second memory module.

23. The memory device according to claim 22, wherein the first memory module of said first pair further comprises a second transmitter configured to transmit the command and write data signal, the transmitted command and write data signal synchronized to the regenerated input clock signal of the first memory module of said first pair, and
wherein the first memory module of said second pair is configured to receive the command and write data signal from the first memory module of the first pair.

24. The memory device according to claim 19, wherein said first memory module further comprises a second transmitter configured to transmit the command and write data signal from the first memory module, the transmitted command and write data signal synchronized to the regenerated input clock signal of the first memory module.

25. The memory device according to claim 19, wherein each of the memory modules further comprises:
a second receiver configured to receive the read data signal.

26. The memory device according to claim 19, wherein each of the memory modules further comprises:
- a second transmitter for transmitting the command and write data signal from the memory module, the transmitted the command and write data signal synchronized to the regenerated input clock signal of the memory module.

27. The memory device according to claim 19, wherein each of the memory modules comprises a memory core configured to store data, wherein the clock synthesizer unit of each memory module is configured to provide a clock signal to the memory core.

28. The memory device according to claim 27, wherein the clock signal provided to the memory core is phase-shifted with respect to the input clock signal.

29. The memory device according to claim 19, wherein each of the memory modules is configured to generate the read data signal according to data stored in a memory core of the memory module.

30. The memory device according to claim 19, wherein the memory device is configured as a DRAM memory device adapted to be used in a computer system.

* * * * *